Patented July 13, 1937

2,086,702

UNITED STATES PATENT OFFICE 2,086,702

MANUFACTURE OF ACETALDEHYDE

Henry Dreyfus, London, England

No Drawing. Application September 5, 1935, Serial No. 39,284

6 Claims. (Cl. 260—138)

This invention relates to the manufacture of acetaldehyde by the catalytic oxidation of ethyl alcohol, and is a continuation in part of copending application S. No. 629,894 filed 22nd August 1932.

The catalytic oxidation of alcohol to acetaldehyde is practised on a large scale by passing alcohol vapor in admixture with oxygen, air or the like over oxidation catalysts at appropriate temperatures, i. e. at temperatures of at least 375° C. In practice it has been very difficult to obtain high yields of acetaldehyde, and it has been found that unless the temperature is kept within narrow limits, extensive side reactions occur and in consequence a poor yield of acetaldehyde is obtained. Since, however, the reaction is highly exothermic, the accurate regulation of the temperature is a matter of considerable difficulty.

Various methods of obtaining or facilitating temperature control have been suggested, and it has long been known that the presence of a certain amount of water vapor is of advantage for this purpose. Thus, for instance, in German Patent No. 168,291 it is indicated that when the gases are diluted with water vapor, the latter acts as a diluent, absorbs the excess heat of reaction, and facilitates the condensation of the reaction product. Another expedient that has been suggested is the use of quantities of air or oxygen less than those theoretically necessary; also it has been proposed to dilute the reactants with indifferent gases.

I have now found that the reaction may very advantageously be performed in the presence of water vapor in amount at least equal to the weight of alcohol employed, and preferably at least twice the weight. In my process the temperature is not regulated during the reaction by adjusting the amount of steam or air present but by ordinary methods of heat transfer whether applied externally or internally. In this process not only is a strict control of the temperature of the reaction possible but also a wider range of temperatures may be employed than has heretofore been considered possible without the occurrence of side reactions to an undesirable extent. Thus I have found that if water vapor is present in an amount corresponding to about 70 parts for each 30 parts of alcohol by weight, a high conversion to acetaldehyde is obtained. While the amount of water vapor employed is not less than the weight of alcohol, and preferably not substantially less than twice this weight, larger amounts of water vapor may be employed, for instance up to about nine times, or more, the weight of alcohol.

The reaction is carried out at temperatures of at least 375° C., temperatures between 400° and 500° C. being very suitable. As stated above, the temperature range within which, for a given catalyst and other reaction conditions, side reactions are unimportant is rendered wider by the invention than has heretofore been the case. Thus, when the reaction is performed in presence of a silver catalyst even if oxygen is present in amount greater than that theoretically necessary, temperatures up to 500° C. and even higher may be employed. It is, in fact, one of the great advantages of the invention that it renders possible the use of active catalysts such as copper, silver, and oxides of these metals without the critical temperature control that has in the past been required, even while it renders that control easier of attainment.

As catalysts for the reaction may be employed any substances capable of promoting the oxidation of ethyl alcohol to acetaldehyde. Copper, silver, and oxides of these metal are, owing to their high activity, especially useful.

If desired, the reaction gases and vapors may be subjected to preheating, for example to a temperature between 80° and 120° C. before entering the reaction zone. Conveniently they may be passed through a tube situated immediately before the reaction zone, and provided with a jacket through which steam may be passed at such temperature that the reactants are preheated to the required degree.

In many cases, for instance when it is desired to oxidize the acetaldehyde to acetic acid, it is not desirable that the large amounts of water employed in the reaction should appear in the final product. In such an event the water may be partly or wholly removed before the condensation of the acetaldehyde. For example, it may be removed to any desired degree from the reaction vapors by passing them over a water binding agent.

The acetaldehyde may, however, be separated from the water vapor present in the reaction vapors in any other convenient way. Thus for example the acetaldehyde may be separated from water vapor and unchanged ethyl alcohol vapor by subjecting the reaction vapors to fractional condensation; or the water vapor and, if desired, unchanged alcohol vapor may be removed from the reaction vapors by scrubbing the latter with a liquid having substantially no solvent power for acetaldehyde, under such conditions that the water vapor or both water vapor and alcohol vapor are condensed and/or dissolved by the scrubbing liquid while the acetaldehyde remains as vapor. Alternatively the reaction vapors may be treated with a liquid capable of dissolving and thus removing acetaldehyde, while leaving the water vapor unaffected, such treatment being preferably performed at a temperature at which the water vapor is not condensed.

The acetaldehyde may be condensed or otherwise worked up in any convenient way. Advantageously, if it is to be oxidized to acetic acid, it may be absorbed in a liquid that may be present in such oxidation without deleteriously affecting the yield of acetic acid obtained, for instance it may very usefully be absorbed in glacial acetic acid.

The following example illustrates the invention, but it is to be understood that this example is solely by way of illustration and is not in any way limitative:—

*Example*

A mixture in the approximate proportions of one volume of ethyl alcohol vapor, twice its weight of water vapor and five volumes of air is preheated and passed at a rate of 10 litres of mixed vapors per cc. of catalyst per hour through a tube, containing a number of discs of silver wire gauze, maintained at a temperature between 450° and 500° C.

The acetaldehyde produced is separated from the reaction product and worked up in any convenient manner.

What I claim and desire to secure by Letters Patent is:—

1. Process for the manufacture of acetaldehyde, which comprises subjecting ethyl alcohol to oxidation by means of gaseous oxygen at temperatures between 375° and 500° C., said ethyl alcohol being in admixture with at least its own weight of water vapor.

2. Process for the manufacture of acetaldehyde, which comprises subjecting ethyl alcohol to oxidation by means of gaseous oxygen at temperatures between 375° and 500° C., said ethyl alcohol being in admixture with from one to nine parts by weight of water vapor to each part of alcohol.

3. Process for the manufacture of acetaldehyde, which comprises subjecting ethyl alcohol to oxidation by means of gaseous oxygen at temperatures between 375° and 500° C., said ethyl alcohol being in admixture with from two to four parts by weight of water vapor to each part of alcohol.

4. Process for the manufacture of acetaldehyde, which comprises subjecting ethyl alcohol to oxidation by means of gaseous oxygen at temperatures between 375° and 500° C., said ethyl alcohol being in admixture with about two parts by weight of water vapor to each part of alcohol.

5. Process for the manufacture of acetaldehyde, which comprises subjecting ethyl alcohol to oxidation by means of gaseous oxygen at temperatures between 450° and 500° C., said ethyl alcohol being in admixture with about two parts by weight of water vapor to each part of alcohol.

6. Process for the manufacture of acetaldehyde, which comprises subjecting ethyl alcohol to oxidation by means of gaseous oxygen at temperatures between 400° and 500° C. and in presence of at least one oxidation catalyst selected from the group consisting of copper, silver and their oxides, said ethyl alcohol being in admixture with about two parts by weight of water vapor to each part of alcohol.

HENRY DREYFUS.